United States Patent Office 3,496,448
Patented Feb. 17, 1970

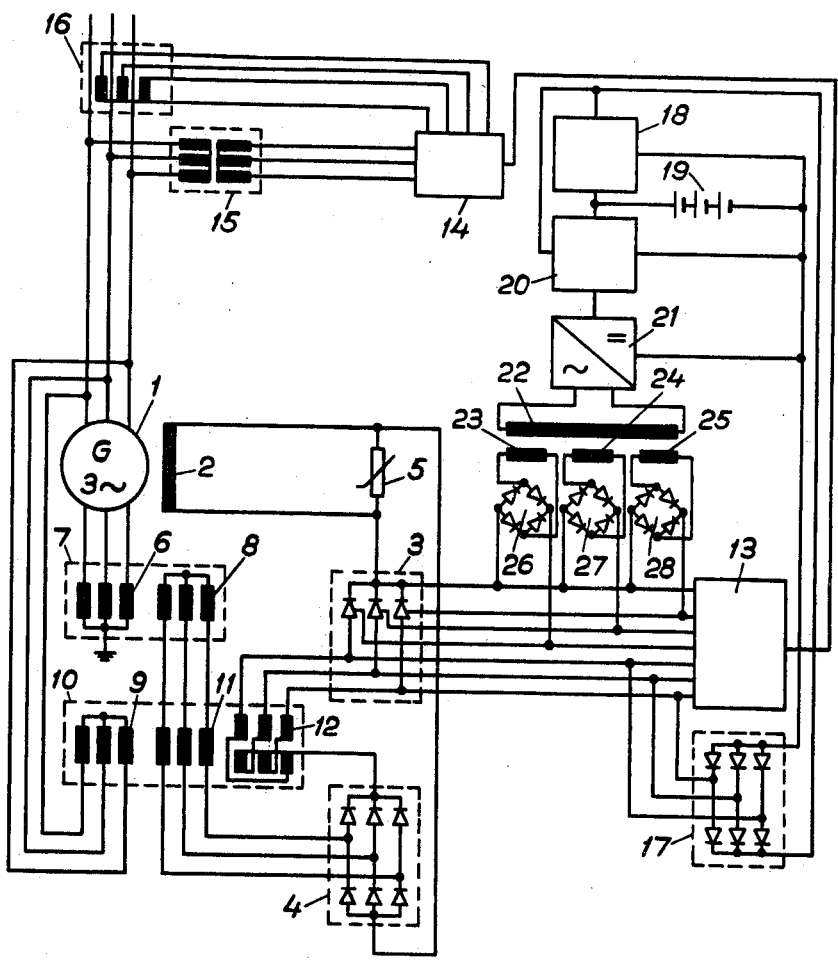

3,496,448
STATIC CONVERTER WITH MEANS RESPONSIVE TO A DECREASE IN OUTPUT VOLTAGE
Lennart Eidenvall, deceased, late of Vasteras, Sweden, by Maj Eidenvall, administrator, Vasteras, Sweden, and Kurt Lidberg, Vasteras, Sweden, assignors to Allmänna Svenska Elektriska Aktiebolaget, Vasteras, Sweden, a corporation of Sweden
Filed June 29, 1966, Ser. No. 568,093
Claims priority, application Sweden, June 29, 1965, 8,532/65
Int. Cl. H02p 9/10, 9/14
U.S. Cl. 322—28
5 Claims

ABSTRACT OF THE DISCLOSURE

A static converter, for instance for feeding the field winding of a generator feeding an AC network and composed of controlled semi-conductor rectifiers, is provided with switching means responsive to a decrease in voltage of the network below a certain value to connect a DC source to the control electrodes of the rectifiers, to enable all the rectifiers to conduct and thereby avoid overloading of any one rectifier.

The present invention relates to a static converter without the disadvantages of presently known static converters having controlled semi-conductor rectifiers which arise when the alternating voltage connected to the converter is reduced or removed and the rectifiers are not able to commutate.

In a static converter, the DC voltage side of which is connected to reactors or E.M.F.'s, the alternating voltage connected to the converter must have a certain minimum size in order to effect commutation. If, at a certain moment, the commutation fails but in spite of that the load current passes the converter, the rectifier or rectifiers which carried current immediately before said moment will continuously carry the whole load current. The rectifiers are normally not dimensioned for this and there is thus a risk of overloading them. A further disadvantage when the commutation fails but the load current still flows is that the converter transformer will be DC magnetised.

The object of the present invention is to effect a static converter without said disadvantages. The invention is characterised in that a switching means is arranged to sense the alternating voltage connected to the static converter and when this voltage is below a certain value, to connect a continuous control current to the ignition electrodes of the controlled rectifiers.

The invention will be further described with reference to the enclosed figure which shows the invention applied to a static converter which is part of a magnetising system for a three-phase synchronous generator 1. The field winding 2 of the generator is fed by two static converters series-connected with each other, the controlled static converter 3 and the uncontrolled static converter 4. A non-linear resistor 5 is connected in parallel with the field winding 2 for limiting the voltage across the field winding. The generator current passes through the primary winding 6 of a three-phase reactor 7. In the secondary winding 8 of the reactor a voltage is then generated which is proportional to the generator current and 90° out of phase with it. The primary winding 9 of the voltage transformer 10 is connected to the output terminals of the generator and measures the output voltage of the generator. In the secondary windings 11 and 12 of the voltage transformer a voltage proportional to the generator voltage is thus generated. As the secondary winding 11 of the voltage transformer 10 is series-connected with the secondary winding 8 of the reactor, the uncontrolled static convertor 4 will be fed by the vector sum $a\overline{U}+bj\overline{I}$, where $\overline{U}$ is the output voltage of the generator, $\overline{I}$ its load current and $a$ and $b$ are constants and $j=\sqrt{-1}$. By suitable adjustment of the constants $a$ and $b$ in a known way it can be obtained that the magnetising demand of the generator within wide limits of output voltage and load current is covered almost exactly by the static converter 4 for every combination of output voltage and load current. In order to make a still more exact adjustment of the generator voltage possible and to permit the voltage to be kept constant at an arbitrary point in the AC network, the controlled static converter 3 is connected in a known way on its DC side in series with the static converter 4. The converter 3 receives control pulses to the rectifiers from the control pulse generator 13 and is arranged to be able to work both as rectifier and inverter. An example of such a control pulse generator 13 is the three-phase version of the one shown in General Electric Controlled Rectifier Manual, Liverpool, New York, 1960, p. 61, FIG. 4.19. The control pulse generator 13 is supplied from the secondary winding 12 of the voltage transformer 10 to which also the static converter 3 is connected. The control pulse generator 13 controls the output voltage of the static converter 3 in accordance with a signal received from a measuring means 14. This latter means contains a compensating impedance as shown in Patent No. 1,800,735 or 1,847,535 for correcting the voltage with regard to the current in a suitable way, the output being rectified and compared with a DC reference voltage obtained, for instance, from a potentiometer and measures the output voltage and the load current of the generator by means of the transformers 15 and 16, combines these two magnitudes in a suitable way and compares the result with a reference magnitude. The difference is as mentioned transmitted to the control pulse generator 13, whereby a closed control circuit known per se is obtained.

According to the invention an independent voltage source is provided, for example the accumulator battery 19 which is charged through the rectifier 17 and the battery charger 18 from the secondary winding 12 of the voltage transformer 10. The battery charging regulator 18 is of the type shown in the GE Manual mentioned above, p. 85, fig. 7.3. The accumulator battery is, by a switching means 20, connected to and feeds an oscillator 21. The switching means 20 is an ordinary voltage sensitive DC relay, the coil of which is supplied from the rectifier 17. The oscillator 21 is of the type shown in the GE Manual, p. 132, fig. 8.29. The output voltage of this oscillator is connected to the primary winding 21 of a transformer 22, which is provided with the secondary windings 23, 24 and 25. These windings are, in series with the rectifier bridges 26, 27 and 28, each connected across the cathode and control electrode of one of the three rectifiers included in the static converter 3. The switching means 20 is arranged to sense the voltage from the rectifier 17, which voltage is proportional to the terminal voltage of the generator, and if this is below a certain value to connect the accumulator battery 19 to the oscillator 21, which then starts and gives a continuous control current to all the three rectifiers of the static converter 3.

Normally the magnetising equipment works in such a way that the static converter 4 generates a magnetising voltage which gives almost exactly the correct field current for the current values of generator voltage and load. Possible corrections are made by the static converter 3, which as it can work either as rectifier or inverter either adds its DC voltage to the output voltage of the static converter 4 or subtracts it therefrom.

If a short circuit occurs on the alternating current network in the vicinity of the generator the terminal voltage of the generator falls to a low value, while the load current increases. The static converter 4 still produces a magnetising voltage, which may be larger than during undisturbed operation. Further a voltage is induced in the field winding 2 which tries to force the field current along. During short circuits the field current may therefore become larger than during normal conditions. At the same time the alternating voltage connected to the static converter 3 sinks to a value which may become so low that the rectifiers of the static converter cannot commutate. If this happens one of the rectifiers will have to carry the possibly increased field current continuously. There is then a great risk that this rectifier becomes overloaded, if it is not heavily over-dimensioned from the beginning. If the generator voltage becomes so low that there is a risk that no commutation occurs, according to the invention the switching means 20 will connect the accumulator 19 to the oscillator 21. This will then start and its output voltage rectified by the rectifiers 26–28 will give a continuous control current to the rectifiers of the static converter 3. These will then divide the field current between them and the risk of overloading is eliminated. Particularly in static converters with several rectifiers operating in parallel in every branch the device according to the invention gives considerable advantages in that when commutation does not occur the equal division of current between the rectifiers operating in parallel in the same branch is facilitated if the continuous control current is supplied.

Also when the generator 1 is started the arrangement according to the invention offers advantages. As the control pulse generator 13 is fed from the generator voltage it will not operate until the generator voltage has reached a rather high value. Before that no field current can flow through the static converter 3. The field winding of the generator must thus in previously known devices be fed from a separate voltage source (for example a station battery) during the greater part of the starting process. If the magnetising equipment is provided with a converter according to the invention, a continuous control current will be supplied to the rectifiers of the static converter in the beginning of the starting process. The need for magnetising current from the station battery will thereby be decreased considerably and may even be eliminated, if the generator has sufficiently high remenance voltage.

It is evident that the range of application of the device is not limited to static converters in magnetising equipment. It gives the same advantages for all static converters, where, for some reason, for example reactors or E.M.F.'s on the DC side, the load current is forced through the static converter even if the alternating voltage fails.

A converter according to the invention may be designed in different ways. Thus in the above shown embodiment the accumulator battery 19 can be replaced by another independent voltage source. If the independent voltage source is an alternating voltage source, the oscillator is not necessary, and the voltage source may be connected to the rectifiers through a transformer and a rectifier. The switching means 20 can be a voltage sensing relay, a static switch or some other device known per se. In the case where the cathodes of all rectifiers in the converter are connected together, as in the static converter 3 above, it is not necessary to have an oscillator 21, and the direct voltage source 19 can then be connected directly to the control electrodes of the rectifiers, possibly through series resistors or a potentiometer to obtain a suitable magnitude of the control current. The oscillator 21 together with the transformer 22 has the advantage that (due to the separate secondary windings 23–25) it is possible to supply the continuous control current to rectifiers at different potentials.

The converter according to the invention thus usually offers the advantages of decreased risk of overloading the rectifiers, when the commutation fails, and prevention of DC excitation of the static converter transformer. In static exciter systems for generators, it also has advantages during the starting process.

We claim:

1. Exciter system for a synchronous generator comprising a static converter with a plurality of controlled semi-conductor rectifiers having control electrodes, said converter having AC terminals connected to the output terminals of the generator and having DC terminals connected in series relation with the field winding of the generator and a control pulse device connected to said control electrodes for supplying control pulses thereto, said exciter system also comprising switching means responsive to a decrease of the output voltage of the generator below a predetermined value to supply a continuous control current to all of the control electrodes of said controlled rectifiers.

2. A static converter with a plurality of controlled semi-conductor rectifiers having control electrodes, said converter having AC terminals connected to an alternating current network and a control pulse device connected to the electrodes of said rectifiers, said control pulse device supplying control pulses to said electrodes and being responsive to the voltage of said AC network, whereby the DC output voltage of said converter may be controlled, a direct current supply means and switching means connected to said AC network and to said direct current supply means, said switching means being responsive to a decrease of the voltage of said AC network below a predetermined value to supply a continuous direct control current from said direct current supply means to said control electrodes.

3. A static converter as claimed in claim 2, said direct current supply means comprising an alternating current source and a rectifier for rectifying the output from said alternating current source.

4. A static converter as claimed in claim 3, said alternating current source comprising an oscillator, a voltage source independent of the alternating voltage connected to the converter to supply power to said oscillator, said switching means including means to connect said voltage source to said oscillator when the alternating voltage connected to the converter is below said valve.

5. A static converter as claimed in claim 4, said independent voltage source comprising an accumulator battery.

References Cited

UNITED STATES PATENTS

| | | | |
|---|---|---|---|
| 3,200,323 | 8/1965 | Faulkes | 322—73 X |
| 3,223,922 | 12/1965 | Borden | 322—72 X |
| 3,226,626 | 12/1965 | Moore | 322—28 X |
| 3,281,652 | 10/1966 | Perrins. | |
| 3,315,141 | 4/1967 | Wright et al. | 322—28 X |
| 3,378,753 | 4/1968 | Poppinger et al. | 322—28 |

ORIS L. RADER, Primary Examiner

H. HUBERFELD, Assistant Examiner

U.S. Cl. X.R.

321—45; 322—73, 88